US012100572B2

(12) United States Patent
Wucherpfennig et al.

(10) Patent No.: US 12,100,572 B2
(45) Date of Patent: Sep. 24, 2024

(54) ROTARY X-RAY ANODE HAVING AN INTEGRATED LIQUID METAL BEARING OUTER SHELL

(71) Applicant: PLANSEE SE, Reutte (AT)

(72) Inventors: Andreas Wucherpfennig, Reutte (AT); Nico Eberhardt, Reutte (AT); Hannes Lorenz, Reutte (AT); Jürgen Schatte, Reutte (AT); Christian Bienert, Reutte (AT); Thomas Schwarz, Reutte (AT)

(73) Assignee: Plansee SE, Reutte (AT)

( * ) Notice: Subject to any disclaimer, the term of this patent is extended or adjusted under 35 U.S.C. 154(b) by 18 days.

(21) Appl. No.: 17/801,334

(22) PCT Filed: Jan. 28, 2021

(86) PCT No.: PCT/AT2021/060029

§ 371 (c)(1),
(2) Date: Aug. 22, 2022

(87) PCT Pub. No.: WO2021/163741

PCT Pub. Date: Aug. 26, 2021

(65) Prior Publication Data

US 2023/0079317 A1 Mar. 16, 2023

(30) Foreign Application Priority Data

Feb. 20, 2020 (AT) ................................ 50033/2020

(51) Int. Cl.
*H01J 35/10* (2006.01)

(52) U.S. Cl.
CPC ................................ *H01J 35/104* (2019.05)

(58) Field of Classification Search
CPC .... H01J 35/10; H01J 35/104; H01J 2235/081; H01J 2235/086; H01J 2235/1013; H01J 2235/106
See application file for complete search history.

(56) References Cited

U.S. PATENT DOCUMENTS 5,204,890 A 4/1993 Anno et al.
5,654,999 A 8/1997 Gemmel et al.
(Continued)

FOREIGN PATENT DOCUMENTS

DE 19614841 A1 10/1997
DE 19906854 A1 8/2000
(Continued)

*Primary Examiner* — Jurie Yun
(74) *Attorney, Agent, or Firm* — Laurence A. Greenberg; Werner H. Stemer; Ralph E. Locher

(57) ABSTRACT

A rotary x-ray anode with an integrated liquid metal bearing outer shell has an anode disc made of Mo or a Mo-based alloy formed with a hole, which is formed centrally in the region of the axis of rotation and extends in the axial direction at least through part of the anode disc, and a bearing bushing made of Mo or a Mo-based alloy. The bearing bushing is connected to the anode disc via a material bond and its inner wall extends the hole in the anode disc. At least an axial portion of an inner wall of the hole in the anode disc and at least an axial portion of an inner wall of the bearing bushing are formed circumferentially as a liquid metal bearing running surface and they form at least a part of a liquid metal bearing outer shell. There is also described a corresponding production method.

13 Claims, 4 Drawing Sheets

(56) References Cited

U.S. PATENT DOCUMENTS

| | | | | |
|---|---|---|---|---|
| 6,198,805 | B1 | 3/2001 | Jambunathan et al. | |
| 2004/0234033 | A1* | 11/2004 | Anno ...................... | H01J 35/10<br>378/133 |
| 2007/0119907 | A1 | 5/2007 | Roedhammer | |
| 2008/0107238 | A1 | 5/2008 | Steinlage et al. | |
| 2011/0058654 | A1 | 3/2011 | Tadokoro et al. | |
| 2016/0086760 | A1 | 3/2016 | Poquette et al. | |
| 2017/0084420 | A1 | 3/2017 | Fukushima et al. | |
| 2017/0125199 | A1 | 5/2017 | Yamamoto | |
| 2017/0169984 | A1 | 6/2017 | Tiwari et al. | |

FOREIGN PATENT DOCUMENTS

| | | | |
|---|---|---|---|
| DE | 102014207467 | A1 | 10/2015 |
| DE | 102015204488 | A1 | 9/2016 |
| DE | 102015215306 | A1 | 2/2017 |
| JP | 2007512959 | A | 5/2007 |
| JP | 2012084400 | A | 4/2012 |
| JP | 2014235968 | A | 12/2014 |
| WO | 2016055319 | A1 | 4/2016 |

* cited by examiner

ROTARY X-RAY ANODE HAVING AN INTEGRATED LIQUID METAL BEARING OUTER SHELL

FIELD AND BACKGROUND OF THE INVENTION

The present invention relates to a rotary x-ray anode having an integrated liquid metal bearing outer shell, to a rotary x-ray anode system having a rotary x-ray anode with an integrated liquid metal bearing outer shell and a liquid metal bearing inner shell inserted therein, and also to a production method for such a rotary x-ray anode.

Rotary x-ray anodes are used in x-ray tubes for generation of x-rays. In use, electrons are emitted from a cathode of the x-ray tube and accelerated in the form of a focused electron beam onto the rotating rotary x-ray anode. Owing to the rotary motion of the rotary x-ray anode, the electron beam scans an annular track—the focal track. A majority of the energy from the electron beam is converted to heat in the rotary x-ray anode, while a small proportion is emitted as x-radiation. The locally released amounts of heat lead to significant heating of the rotary x-ray anode. The rotation of the rotary x-ray anode counteracts overheating of the anode material.

Especially in the high-performance sector, a high radiation power (or dose power) is required, which can be generated by using a correspondingly high-energy and highly focused electron beam. In order to avoid material fatigue on account of high temperatures and temperature gradients, rotary x-ray anodes must be designed for high frequencies of rotation and for effective and homogeneous dissipation of heat. With regard to these demands, it is advantageous to use a liquid metal bearing for mounting of the rotary x-ray anode.

US 2016/0086760 A1 and US 2017/0125199 A1 each disclose a rotary x-ray anode system in which a liquid metal bearing outer shell is inserted as insert into a central passage hole of the rotary x-ray anode. US 2016/0086760 A1 also discloses a friction welding method using an intermediate component introduced into the weld zone. Further rotary x-ray anode systems are known from publications U.S. Pat. Nos. 5,204,890 A and 6,198,805 B1.

SUMMARY OF THE INVENTION

It is an object of the present invention to improve rotary x-ray anodes with regard to good mounting at high frequencies of rotation and to homogeneous and effective dissipation of heat. Moreover, inexpensive manufacture of the rotary x-ray anode in a stable process is to be enabled.

The object is achieved by a rotary x-ray anode as claimed, by a rotary x-ray anode system as claimed and by a method of producing a rotary x-ray anode as claimed. Advantageous developments of the invention are specified in the dependent claims.

According to the present invention, a rotary x-ray anode with an integrated liquid metal bearing outer shell is provided. The rotary x-ray anode has an anode disk made of Mo (Mo: molybdenum) or an Mo-based alloy and having a hole formed in the center in the region of the axis of rotation and extending in axial direction at least through a portion of the anode disk, and a bushing made of Mo or an Mo-based alloy. The inner wall of the bushing, at least over an axial section thereof, is formed circumferentially (i.e. in circumferential direction based on the axis of rotation) as a liquid metal bearing running surface and forms a first subsection of the liquid metal bearing outer shell. More particularly, the entire (typically cylindrical) inner wall of the bushing may take the form of a liquid metal bearing running surface. Alternatively, it is also possible for merely an axial section of the inner wall of the bushing, which is then likewise typically in cylindrical form, to take the form of the liquid metal bearing running surface, while a further axial section may also have, for example, mechanical boundary elements and/or a coating by which liquid metal is retained in the liquid metal bearing in use. The liquid metal bearing outer shell is formed by the first and an adjoining second subsection and has a continuous liquid metal bearing running surface. The bushing is connected here to the anode disk via a material bond in such a way that the inner wall of the bushing continues the hole in the anode disk. Moreover, at least an axial section of an inner wall of the hole in the anode disk is formed circumferentially (i.e. in circumferential direction based on the axis of rotation) as a liquid metal bearing running surface and forms at least a portion of the second subsection of the liquid metal bearing outer shell. Here too, it is again possible for the entire (typically cylindrical) inner wall of the hole to be formed circumferentially as liquid metal bearing running surface. In the case of a blind hole, it is optionally also possible for the base of the hole to form a liquid metal bearing running surface. Alternatively, it is also possible for just an axial section of the inner wall of the hole, which is then likewise typically cylindrical, to be formed circumferentially as liquid metal bearing running surface.

In liquid metal bearings, a defined bearing gap is formed between a liquid metal bearing outer shell and a liquid metal bearing inner shell, which are matched to one another, and one of which is formed on a stationary component and one on a rotating component. In the present case, the liquid metal bearing outer shell is formed integrally with the rotary x-ray anode and hence as a rotating component. The liquid metal bearing inner shell may, for example, be formed integrally on a spigot (stationary component) inserted into the liquid metal bearing outer shell. In use, the bearing gap is filled with liquid metal (e.g. gallium, a gallium alloy, for example an eutectic gallium-indium-tin alloy, etc.). The gap width is typically from a few micrometers up to 500 μm (at least ≤1 mm); especially 5-500 μm, preferably 7-40 μm, where the gap width may also vary over the length of the bearing gap. In particular, it is also possible for at least one circumferential cutout and/or step or ridge to be provided in the liquid metal bearing outer shell and/or inner shell, in the region of which the gap width may also be formed differently from the rest of the bearing gap (cf., for example, DE 10 2015 215 306 A1). More particularly, at least one circumferential ridge may be provided on one component, with (at least) a correspondingly formed groove on the other component for fixing of the two components relative to one another in axial direction. The liquid metal bearing running surfaces refer to the sections of the liquid metal bearing outer shell and of the liquid metal bearing inner shell that are wetted with liquid metal in use both on the liquid metal bearing outer shell and on the liquid metal bearing inner shell and hence enable low-friction rotation. The liquid metal prevents direct contact between the liquid metal bearing outer shell and the liquid metal bearing inner shell and simultaneously acts as a lubricant, which achieves excellent running characteristics. For driving of the rotary x-ray anode, the liquid metal bearing outer shell is provided with or coupled (mechanically) to a rotor, which is set in rotation in a known manner in interaction with a stator.

The use of a liquid metal bearing for mounting of the rotary x-ray anode is advantageous since liquid metal bearings are designed for a high load and for high frequencies of rotation, and at the same time have high operational reliability and a long lifetime. One advantage (over a ball bearing for example) is that the elevated pressure of the liquid metal present in the bearing gap is formed over a greater section of the area (especially in axial extent), and hence mechanical stability is increased. More particularly, in the case of liquid metal bearings, frequencies of rotation of up to 300 Hz (hertz) are possible, whereas ball bearings, for example, are generally designed for frequencies of rotation of well below 200 Hz (e.g. 140 Hz). In addition, liquid metal bearings, by comparison with ball bearings, have a low noise level and, on account of the elevated contact area (via the liquid metal-filled bearing gap), enable effective dissipation of heat over a large area. In this way, the heat can be dissipated effectively to the stationary component (for example to a spigot inserted on the inside into the liquid metal bearing outer shell). The heat can then be removed effectively in turn from the stationary component via cooling on the inside (by means of a coolant conducted within at least one cooling duct), such that thermal management is very effective and hence suitable for the high-performance sector. Ball bearings, by contrast, on account of the heat-sensitive coatings used, are not designed for effective removal of heat via the bearing, since this would lead to damage to the respective coating.

Mo or Mo-based alloys are particularly advantageous as material for the anode disk and for the bushing since they have high strength (even at the high use temperatures) and enable good dissipation of heat. Moreover, Mo or Mo-based alloys have good wettability for the liquid metals that are typically used. Accordingly, it is also advantageous that the inner wall of the bushing and the inner wall of the hole in the anode disk are formed as liquid metal bearing running surface since even the base material thus gives rise to good wettability.

It is optionally possible to provide a coating (of thickness typically less than 10 μm) on the inner wall of the bushing and/or on the inner wall of the hole—in each case fully or else only in sections. However, there is no provision of a separate insert with a liquid metal bearing outer shell on the inside which would have to be inserted into the hole in the anode disk and bonded thereto, which would be more complex in terms of production and could constitute a barrier to the dissipation of heat. Moreover, high mechanical stability is achieved between the anode disk and the liquid metal bearing outer shell, which is advantageous for the running characteristics. By virtue of the inner wall of the bushing continuing the inner wall of the hole in the anode disk and hence providing a liquid metal bearing running surface with a correspondingly long axial extent, this ensures mechanically stable and precise guiding on rotation of the anode disk.

What is meant in the present context by an Mo-based alloy is an alloy containing >50% by weight of Mo. In particular, it contains ≥80% by weight, even more preferably ≥98% by weight, of Mo, which is particularly advantageous with regard to the above-mentioned properties of Mo. The anode disk and the bushing here need not be formed entirely from Mo or an Mo-based alloy; instead, particular reference is being made here to the base material. In particular, they may be provided a coating (e.g. a blackening layer for increasing the heat output emitted), fitted components, for example a C-based body secured on the anode disk as heat storage means (e.g. graphite body), a flange mounted on the bushing, etc., or else a coating, for example a circumferential focal track coating applied in the region of the focal track. As elucidated at the outset, the "focal track" here means the circumferential section of the anode disk, forming a ring around the axis of rotation, which is scanned by the electron beam in use. Typically, in the region of the focal track (with a certain radial extent), a focal track coating is applied to the anode disk. The focal track coating is especially formed by W or a W—Re alloy with a Re content of 1-15% by weight, especially of 5-10% by weight (W: tungsten; Re: rhenium). In addition, the anode disk, in the region of the focal track, typically has an angled focal track surface that preferably forms a circumferential frustoconical shell surface. More particularly, the focal track surface is angled relative to a reference plane that extends at right angles to the axis of rotation, which enables the exit of the generated x-radiation through a lateral exit window in the respective x-ray device. For example, it forms a focal track angle in the range of 2°-16.25°, especially of 7°-13°, relative to this reference plane.

The "axis of rotation" referred to is defined by the rotationally symmetric basic shape of the rotary x-ray anode and of the liquid metal bearing outer shell. The axis of rotation simultaneously defines the "axial direction" (which runs parallel thereto) and the "radial direction" (which runs at right angles thereto). A "reference plane" of the rotary x-ray anode (which typically simultaneously forms the main plane of extension thereof) especially extends perpendicular to the axis of rotation. It should be noted that the rotary x-ray anode need not be exactly rotationally symmetric in every detail, such that, for example, slits formed in circumferential direction, periodic arrangements of projections, depressions, fitted components, etc., may disrupt an exact rotational symmetry. A bushing refers to a component with a (passage) hole, the inner wall of which in the present context is formed at least in sections as a liquid metal bearing running surface, wherein the bushing may have different contours (especially outlines) and fitted components. The bushing (and correspondingly the mechanical mounting of the rotary x-ray anode), in a preferred variant, is disposed on the opposite side of the anode disk from the focal track. Alternatively, the bushing (and correspondingly the mechanical mounting of the rotary x-ray anode) may also be disposed on the side of the anode disk on which the focal track is provided.

According to the present invention, the first subsection of the liquid metal bearing outer shell is formed monolithically with the bushing, and at least a portion of the second subsection of the liquid metal bearing outer shell is formed monolithically with the anode disk. What is meant here by "monolithically" is that the component in question is produced in one piece by metallurgical production (preferably by powder metallurgy or alternatively by melt metallurgy), with the possibility of subsequent mechanical processing, for example for introduction of the hole and/or surface structuring, and/or of a subsequent application of at least one layer. Monolithic formation is apparent to the person skilled in the art from a homogeneous and constant microstructure (of the base material composed of Mo or an Mo-based alloy). Preference is given to production by powder metallurgy of the anode disk and/or of the bushing, where this comprises the steps of pressing and sintering corresponding starting powders and preferably subsequent forming (e.g. rolling, forging, extruding, etc.) of the resultant shaped body. The production by powder metallurgy leads to a typical microstructure apparent to the person skilled in the art which is clearly distinguishable, for example, from a melt microstructure (obtained in production by melt metallurgy). The inner wall of the bushing, at least in the region of the liquid metal bearing running surface, is thus formed from the base material (Mo or Mo-based alloy) of the bushing, and the inner wall of the hole in the anode disk, at least in the region of the liquid metal bearing running surface, is formed from the base material (Mo or Mo-based alloy) of the anode disk. At the inner wall of the bushing and/or at the inner wall of the hole in the anode disk, a coating (of thickness typically less than 10 μm) and/or surface structuring may also be provided.

A material bonding connection is understood to mean that a continuous material bond is created, but not that there is merely a mechanical connection (for example via a screw or clamp connection, via mechanical securing elements, etc.). More particularly, the material bonding connection of the bushing and the anode disk is established by welding, by soldering or by diffusion bonding (diffusion bond). If the bonding zone is examined by microscopy in section, a weld bond is apparent to the person skilled in the art by a corresponding weld zone (molten or at least plastified base material), a solder bond by a corresponding solder zone (melt structure of the solder), and a diffusion bond by a corresponding diffusion zone (diffusion region of the mutually bonded base materials).

Formation as a liquid metal bearing outer shell is apparent to the person skilled in the art from the shaping, especially from the liquid metal bearing running surface formed on the inside in a rotationally symmetric manner to the axis of rotation, and from the inner contour that enables the introduction of a spigot (or other type of component) with a corresponding liquid metal bearing inner shell.

There is also no provision of a running groove for a ball bearing on the inner contour (even if the liquid metal bearing running surface may in principle be gradated and/or provided with a ridge or a cutout). Optionally provided in the region of the end sections of the liquid metal bearing outer shell and/or of a liquid metal bearing inner shell are surface structuring, a coating and/or mechanical boundary elements for retaining the liquid metal in the region of the liquid metal bearing.

In one development, the material bonding connection is a bond established via diffusion bonding, a friction welding bond or a beam welding bond (by laser or electron beam). The advantage of the bonding techniques mentioned is that a material bonding connection with high strength is achievable therewith, even at the high use temperatures. More particularly, in the region of the bonding zone, it is possible to dispense with any added material (such as a solder, a filler material, etc.), which can form a troublesome impurity (for example in the liquid metal) in the region of the liquid metal bearing, can be critical for vacuum stability (use under high vacuum), and/or can have a lower melting point (compared to the base material of the components bonded). This is especially advantageous compared to a solder bond in which the solder typically has a lower melting point and—at least at high temperatures—a lower strength than the base material (of the bonded components).

In the case of diffusion bonding, the (typically appropriately prepared) surfaces of the components to be joined are assembled and diffusion of the atoms in the region of the bonding zone is brought about by application of pressure and temperature, so as to result in a material bonding connection (diffusion bond). According to the (narrower) understanding of diffusion bonding that forms the basis here, no melting of the base material of the components to be bonded takes place in the region of the bonding zone. As already elucidated above, diffusion bonding is apparent to the person skilled in the art by a microscope analysis of the bonding zone in microsection, from a corresponding diffusion zone (diffusion region of the mutually bonded base materials) in which no melt microstructure occurs. If components made of the same material are bonded to one another by diffusion bonding, the diffusion bond may not be apparent in the microscope section, since a uniform microstructure which is constant with respect to the particular base material can be achieved in the region of the bonding zone. In these cases, the presence of a diffusion bond may then be derived merely from the outward geometry of the components bonded (in the present case: anode disk and bushing), for example because they would not be producible in the respective overall form in one piece (for example by powder metallurgy). A beam welding bond is apparent to the person skilled in the art from a microscope analysis of the bonding zone in microsection, from the weld zone in which a corresponding melt microstructure (of the base materials and possibly also of an additionally used filler material) occurs, and from the root and position of the melt zone. A beam welding bond (especially by means of electron beam welding) is advantageous on account of the small heat-influenced zone. Moreover, the beam welding method is of better suitability for Mo-based alloys than for pure molybdenum.

In the case of friction welding, a component is moved relative to and in contact with the other component to be bonded (e.g. rotated), in order to generate heat at the abutting surfaces. The weld is completed by applying a force during or after the cessation of the relative movement (e.g. rotational movement), there being multiple forms of energy supply and of relative movement. In the present case, the bonding is between largely rotationally symmetric components, and therefore one component (for example the bushing or a stub) is set in rotation and then brought into contact with the other component (for example the anode disk), in order to generate heat of friction. Friction welding, which also enables the bonding of components of higher wall thicknesses (especially 20-130 mm), results only in a comparatively low joining temperature in the joining cross section and is thus suitable in many cases for materials and material combinations that otherwise have to be welded with difficulty (in this regard see also DIN EN ISO 15620). This is especially true of pure Mo, and furthermore also of Mo-based alloys. A friction welding bond is apparent to the person skilled in the art from a microscope analysis of the bonding zone in microsection, by means of a typical microstructure. More particularly, no melt microstructure is apparent since the base material is merely put into a plastified state during the friction welding. Typically, the weld zone is comparatively narrow and has a fine-grain microstructure. Specifically in the case of a friction welding bond of the bushing and the anode disk, each of which is formed from Mo and/or (an) Mo-based alloy, multiple weld zones (between the base material of the bushing and of the anode disk) with slightly different microstructure are apparent in the region of the weld zone. This relates more particularly to grain size distribution and grain alignment. Typically, the grains are extended in the direction of material flow, which occurs especially when the welding bead is formed. Zones of different grain extension (with high grain extension close to the bushing and lower grain extension close to the anode disk) occur especially when the bushing has high grain extension and the anode disk has lower grain extension, which is manifested in these components by virtue of their respective production processes. Macroscopic indications of a friction welding bond, moreover, are when a protruding connection port is used on the anode disk in order to enable the formation of a welding bead during friction welding (on account of the flow of material during the compression phase). This is apparent especially from a weld zone between the connection port and the bushing which is spaced apart from the anode disk.

In one development, the Mo-based alloy(s) (of the anode disk and/or of the bushing) are MHC and/or TZM. More particularly, the base material of the bushing (i.e. apart from coatings, fitted components, etc.) is made from MHC and/or TZM (preferably solely from MHC or solely from TZM). More particularly, the base material of the anode disk (i.e. apart from coatings, fitted components, etc.) is made from MHC and/or TZM (preferably solely from MHC or solely from TZM). Both alloys (MHC, TZM) have high strength and hardness. Their mechanical properties are very substantially maintained at high temperatures, which enables higher process temperatures in production, and also higher use temperatures of the rotary x-ray anode. This is especially true of MHC for temperatures up to 1250° C. and for TZM up to 1100° C. MHC is thus of particularly good suitability for the high-performance sector and for high use temperatures.

MHC is an Mo-based alloy supplied by the applicant, Plansee SE, having the following composition:

- an Hf content of 1.00-1.30% by weight,
- a C content of 500-1200 μg/g (μg: micrograms),
- balance: Mo (typically ≥97.0% by weight, preferably ≥98.0% by weight, where the Mo content, with a correspondingly low proportion of impurities, may even be 98.5% by weight).

TZM is an Mo-based alloy specified in the standard ASTM B387 (364) and supplied by the applicant, Plansee SE, which has the following composition for the present application:

- a Ti content of 0.40-0.55% by weight,
- a Zr content of 0.06-0.12% by weight,
- a C content of 50-500 μg/g, where this range which is specifically of very good suitability for the field of application of rotary x-ray anodes is somewhat broader than the range of 100-400 μg/g specified in standard ASTM B387 (364),
- balance: Mo (typically ≥98.0% by weight, preferably ≥99.0% by weight, where the Mo content, with a correspondingly low proportion of impurities, may even be 99.3% by weight).

The possible/admissible content of any impurities that may be present is typically not specified for all elements, but rather particularly for those that are typically present and/or for which too high a content would be critical for the advantageous properties of the alloy. Against this background, the following admissible ranges of impurities are particularly advantageous: in particular, the content of metallic impurities in MHC and in TZM adds up to 5000 μg/g. Especially in the case of MHC and TZM according to the particularly advantageous specification of Plansee SE, the content of each of Al (aluminum) and Ni (nickel) is ≤10 μg/g, the content of each of Cr (chromium), Cu (copper), Fe (iron), K (potassium), and Si (silicon) is ≤20 μg/g, the content of W (tungsten) is ≤300 μg/g, the content of each of Cd (cadmium) and Pb (lead) is ≤5 μg/g, and the content of Hg (mercury) is ≤1 μg/g. The content of any H (hydrogen), N (nitrogen) and O (oxygen) impurities that may be present in MHC adds up to ≤1000 μg/g. Especially in MHC according to the specification of Plansee SE, the content of each of H and N is ≤10 μg/g and the content of O is ≤600 μg/g. The content of any H, N, O and C (carbon) impurities that may be present in TZM adds up to ≤1500 μg/g. Particularly in the case of TZM according to the specification of Plansee SE, the content of each of H and N is ≤10 μg/g and the content of O is ≤500 μg/g. Depending to the production process, Cr(VI) impurities and organic impurities are possible and acceptable each up to a maximum value of ≤1000 μg/g; they are typically undetectable in the alloys supplied by Plansee SE. The sum S of all impurities for MHC and for TZM is advantageously as far as possible in the range of 0≤S ≤6000 μg/g, with W (tungsten) as typical impurity preferably having a proportion of ≤300 μg/g.

In principle, the anode disk and the bushing may be made of different materials. In one development, the anode disk and the bushing are both formed from molybdenum or from the same molybdenum-based alloy. This is advantageous especially for the material bonding connection (especially in the case of a friction welding bond or a beam welding bond) on account of the same material properties of the two components (for example both made from MHC or else both made from TZM). As will be clear to the person skilled in the art, molybdenum-based alloys are said to be the same even when there are slight differences in composition. Merely "slight differences" exist especially when the two compositions are within the specification of the Mo-based alloy in question (for example for TZM or MHC as specified above). If there is no specification for the alloy in question, there are generally merely "slight differences" even when the difference in the Mo content is ≤2% by weight, that of non-metallic alloy constituents (e.g. C, N) adds up to ≤0.2% by weight, and that of any existing metallic alloy constituents present adds up to ≤1% by weight and that of W is ≤0.05% by weight (with regard to impurities, the ranges specified above for TZM and MHC in particular are applicable).

In one development, the material bonding connection is a friction welding bond. This is advantageous with regard to the achievement of high strength and thermal stability of the bond. In addition, in friction welding technology, there is high reproducibility and a high level of automation. In the case of friction welding, preference is given to dispensing with any added material (for example a filler material, an insert introduced between the components to be bonded, etc.), meaning that there is essentially no extraneous material other than the base material of the bonded components and essentially no different composition detectable in the region of the material bonding connection. Mo-based alloys are preferred over pure Mo in the case of friction welding. Even more preferably, the two components (anode disk, bushing) are formed from the same Mo-based alloy (e.g. both formed from MHC, both formed from TZM, etc.), since it is possible in this way to achieve particularly high stability and quality of the friction welding bond. What is particularly advantageous about friction welding (by comparison, for example, with a beam welding method) is that no melt is formed in the bonding zone; instead, the base material of the components to be bonded is merely plastified. This establishes an advantageous microstructure in the region of the bonding zone, and maintains a homogeneous distribution of the elements/compounds present (for example in an Mo-based alloy).

In one development, the anode disk, toward the side of the bushing, has a connection port, the inner wall of which extends the hole in the anode disk, and which protrudes with respect to the peripheral face on the outside of the anode disk. At least an axial section of the inner wall of the connection port is formed here circumferentially as a liquid metal bearing running surface and forms (as well as the inner wall of the hole in the anode disk and any further sections) a portion of the second subsection of the liquid metal bearing outer shell. In addition, the material bonding connection is formed between the protruding connection port of the anode disk and the bushing. By virtue of the protruding connection port, which may especially have a tubular or hollow-cylindrical base form, the material bond between the anode disk and the bushing can be established more easily. This is especially true in the case of a friction welding bond (but also in the case of a beam welding bond), since this essentially provides two identical sections to be bonded to one another (especially with circumferential wall and annular end faces). The material bonding connection is thus also spaced apart from the peripheral face on the outside of the anode disk, for example by 2-50 mm, preferably by 5-30 mm (ranges applicable to the completed material bond). This creates sufficient space for the formation of the welding bead, which especially forms in the case of a friction welding bond by the flow of the material during the compression phase (the welding bead is subsequently removed by further processing). The original axial length of the connection port (before establishment of the material bond), especially when a friction welding process is employed, should be chosen so as to be longer than the later desired position of the material bond, for example 3-8 mm longer, since compression is effected during the friction welding. The connection port is preferably formed monolithically with the anode disk, which is advantageous with regard to stability and running characteristics. Preferably, the connection port is formed monolithically from the material of the anode disk in a forging process. Alternatively, it may also be materially bonded to the anode disk.

In one development, the hole in the anode disk takes the form of a passage hole, and the anode disk, on the opposite side from the bushing, has an extension port, the inner wall of which extends the passage hole of the anode disk, and which protrudes with respect to the peripheral face on the outside of the anode disk. At least an axial section of the inner wall of the extension port here is formed circumferentially as a liquid metal bearing running surface and forms (in addition to the inner wall of the hole in the anode disk, optionally of the connection port and any further sections) a portion of the second subsection of the liquid metal bearing outer shell. The provision of such an extension port is advantageous with regard to the stability and running characteristics of the liquid metal bearing outer shell (especially since an extension of the liquid metal bearing running surface is then provided on either side of the anode disk). In a corresponding manner to the case of the connection port, it is also possible for the extension port preferably to be formed monolithically with the anode disk (for example formed by forging) or alternatively to be materially bonded to the anode disk. Preferably, the extension port and any further components present then form the conclusion of the liquid metal bearing outer shell. Alternatively, it is also possible—depending on the construction of the liquid metal bearing—for another bearing to be materially bonded to the extension port and hence for the liquid metal bearing outer shell to be extended even further, and the variants described for the bonding of the connection port to the bushing are likewise possible here.

In one development, the thickness (measured in axial direction) of the anode disk increases in radial direction toward the axis of rotation. This increase in thickness may be continuous (with constant slope or else with a varying thickness profile) or else in one or more stages. It is thus possible for the heat generated in the region of the focal track to be divided over an increasingly greater material cross section toward the axis of rotation and then to be removed effectively (via the liquid metal disposed in the bearing gap and then via the liquid metal bearing inner shell and the adjoining components, for example via a spigot with coolant cooling) over the large area of the liquid metal bearing outer shell. This increase in material cross section in the radially inward direction avoids locally occurring temperature spikes and an excessive temperature in the region of the liquid metal bearing that could lead to damage to the liquid metal bearing and to stresses in the anode disk. In one development, the increase in thickness, proceeding from a reference thickness measured radially in the middle in the region of a beveled focal track area up to the thickness in the region of the hole, is 30-300%, especially 50-260%, even more preferably 70-230% (an increase in thickness by 100% corresponds to a doubling of the thickness). This is particularly advantageous with regard to the dissipation of heat and with regard to the stability and running characteristics of the liquid metal bearing outer shell. “Thickness in the region of the hole” refers to the thickness of the anode disk directly in the region of the inner wall of the hole, and this measurement of thickness also includes any sections formed monolithically with the anode disk, for example a monolithic connection port and/or a monolithic extension port, but not components merely materially bonded to the anode disk (e.g. the bushing). Preferably, however, the anode disk increases in thickness in the radially inward direction without including any monolithic connection ports and/or extension ports. In particular, the latter increase in thickness is 20-150%, preferably 30-100%, using a reference region directly (radially) outside a connection port and/or extension port rather than the “region of the hole” in the case of provision of this monolithic connection port and/or extension port.

In one development, the anode disk has multiple slits that are arranged uniformly over the circumference and pass through the thickness of the anode disk, each of which extends over a radial section in the region between an outer circumference of the anode disk and the hole in the anode disk. Such slits, in use at the elevated temperatures that occur, enable expansion of the material of the anode disk without plastic deformation thereof, which avoids stresses within the material and hence a material fatigue or a material failure. Such slits here may extend exactly radially. Alternatively, they may also run slightly obliquely to radial direction (for example at an angle of >0° up to 5°). The progression in relation to radial direction, the progression in relation to axial direction (here too, they may run at a slight inclination to axial direction, for example by an angle in the range of 1°-10°), and/or the width of the slits may vary according to a defined contour. In addition, at at least one end of the slits (preferably at the radially inner end), there may also be provision of concluding holes that preferably extend through the thickness of the anode disk and each have a greater diameter than the width of the opening slits, and/or of a circumferential groove. Preferably, the slits extend right up to the outer circumference, i.e. open into the outer circumference, while they end radially outside the hole in the anode disk. Preferably, all slits are formed symmetrically with respect to one another in relation to the axis of rotation. The provision of such slits is advantageous especially when the thickness of the anode disk increases toward the axis of rotation.

The present invention further relates to a rotary x-ray anode system comprising a rotary x-ray anode of the invention with integrated liquid metal bearing outer shell, which may optionally also be formed according to one or more of the above-elucidated developments, and a liquid metal bearing inner shell that has been inserted into the liquid metal bearing outer shell and has a liquid metal bearing running surface, wherein the liquid metal bearing outer shell and the liquid metal bearing inner shell are matched to one another such that a defined bearing gap is formed between them (gap width especially as specified above).

In one development, in the region of at least one axial end section (axial: based on the axis of rotation) of the liquid metal bearing running surface at the liquid metal bearing outer shell and/or of the liquid metal bearing running surface at the liquid metal bearing inner shell, at least one circumferential mechanical boundary element is provided, which, in use, limits flow of liquid metal present in the bearing gap in axial direction. The mechanical boundary element consequently serves to retain the liquid metal in the (axially) inner region of the liquid metal bearing, where it is required to achieve the lubricating effect. The mechanical boundary element may especially be formed by one or more of the following variants:

a continuation of the bearing gap formed by multiple stages, for formation of a labyrinth seal (cf., for example, JP 2012/084400 A);

one or more circumferential (constant, or else interrupted by short sections in circumferential direction) ridge(s) on one (e.g. stationary, inner) component and corresponding groove(s) on the other (e.g. rotating, outer) component of the liquid metal bearing, as a result of which axial fixing of the liquid metal bearing is simultaneously also provided; in the case of multiple ridge (s), these may also be provided alternately on one and on the other component;

a gasket ring made of a material (for example an iron-, nickel- and cobalt-containing alloy) that interacts with the liquid metal present in the bearing gap (cf., for example, DE 10 2015 204 488 A1).

In one development, in the region of at least one axial end section of the liquid metal bearing running surface at the liquid metal bearing outer shell and/or of the liquid metal bearing running surface at the liquid metal bearing inner shell, a circumferential coating is provided, which suppresses wetting by the liquid metal in the bearing gap during use. This retains the liquid metal in the (axially) inner region of the liquid metal bearing, where it is required for achievement of the lubrication effect. Suitable coatings include titanium oxides, aluminum oxides, titanium nitrides and mixtures thereof, especially CrN (chromium nitride), $Cr_2N$ (dichromium nitride), $Cr_2O_3$ (chromium(III) oxide), TiAlN (titanium aluminum nitride) (cf., for example, US 2017/0169984 A1). The coating may be provided both on the liquid metal bearing inner shell and on the liquid metal bearing outer shell. If appropriate, however, it may also be provided solely on one shell (for example solely on the liquid metal bearing inner shell). In addition, it may also be provided in the region of at least one mechanical boundary element.

In one development, the liquid metal bearing inner shell is formed on a spigot guided through the bushing at least into the hole in the anode disk. Preferably, the spigot has at least one coolant duct for guiding of coolant. If the hole is formed as a passage hole, the spigot preferably likewise extends completely through this passage hole. The spigot here may preferably be formed from one component (in one-piece form), since this is advantageous with regard to the stability thereof and the leakproofing of the coolant duct. Alternatively, it may also be formed from multiple components bonded to one another in a form-fitting and/or material-bonding manner, which may especially be advantageous in the case of a complex construction of the liquid metal bearing. By means of the at least one coolant duct that preferably extends over at least 80% of the length of the spigot, heat can be removed effectively in use.

In one development, the liquid metal bearing running surface at the liquid metal bearing outer shell and/or the liquid metal bearing running surface at the liquid metal bearing inner shell has at least two circumferential, superficially structured running sections that are spaced apart in axial direction. Preferably, at least one section without superficial structuring is provided between the at least two superficially structured running sections. In the region of the superficially structured running sections, liquid metal collects in use on rotation of the rotating component and develops an elevated pressure. This achieves a particularly good lubricating effect. At the same time, fixing of the rotating and static components in radial direction relative to one another is achieved. The provision of at least two such running sections also prevents tilting and vibration of the rotary x-ray anode in use. It is particularly advantageous here when a superficially structured running section is formed in a region disposed entirely within the anode disk or is formed so as to overlap at least with this region. The superficial structuring here may take the form, for example, of a groove pattern (having, for example, one or more subregions each with grooves running parallel to one another). The superficially structured running sections may in principle be provided both on the liquid metal bearing inner shell and on the outer shell. In principle, superficially structured running sections may also be formed opposite one another (based on the bearing gap). It is preferable, however, that, in the region of a superficially structured running section of one component (for example on the liquid metal bearing inner shell), the other component in the opposite region does not have a superficially structured running section.

The present invention further relates to a method of producing a rotary x-ray anode of the invention, which may optionally also be formed according to one or more of the above-elucidated developments and variants, wherein the method has the following steps:

providing an anode disk made from Mo or an Mo-based alloy, providing a stub made from Mo or an Mo-based alloy, materially bonding the stub to the anode disk in such a way that the stub is in a central arrangement based on an axis of rotation of the anode disk, and mechanically working the anode disk and the stub to form the rotary x-ray anode with integrated liquid metal bearing outer shell, wherein the stub forms the bushing with the liquid metal bearing running surface and the anode disk has the hole, in which at least an axial section of the inner wall is formed circumferentially as liquid metal bearing running surface.

The method establishes an inexpensive and reliable production route for production of rotary x-ray anodes of the invention. In addition, the above-elucidated developments and variants are also possible in the method of the invention by provision of corresponding method steps, with achievement of the above-elucidated advantages.

Preferably, the anode disk and/or the stub is provided by powder metallurgy production. This especially comprises the pressing and sintering of corresponding starting powders, preferably also forming (e.g. rolling, forging, round rolling, round forging, etc.). A hole in the anode disk and/or a passage hole in the bushing may already have been preformed prior to the material bonding, which makes further mechanical processing less complex. Alternatively, they may also be elaborated in mechanical processing operations (i.e. the anode disk and/or the stub still does not have a hole or passage hole prior to the material bonding). The material bonding is preferably effected by friction welding. A focal track coating may already have been applied on the anode disk prior to the material bond (for example by powder metallurgy production in the composite), but may also have been applied subsequently, for example by thermal spraying (e.g. vacuum plasma spraying), by chemical gas phase deposition (CVD: chemical vapor deposition) or by physical gas phase deposition (PVD: physical vapor deposition). Further fitted components, coatings, coverings, etc., which have been elucidated at the outset, may likewise be added in the course of production.

Further advantages and expediencies of the invention will be apparent from the description of working examples that follows, with reference to the appended figures.

DETAILED DESCRIPTION OF THE INVENTION

FIGS. 1-9 are schematic diagrams in which the size ratios are not exactly reproduced, and the details of the axially terminal ends of the liquid metal bearing outer shell and of the liquid metal bearing are not shown. For the axially terminal ends of the liquid metal bearing—as is known in the specialist field—different configurations are possible, examples of which include those shown in DE 10 2015 204 488 A1, US 2016/0086760 A1, U.S. Pat. No. 5,204,890 A, JP 2012/084400 A and US 2017/0169984 A1. In other words, in the diagrams of FIGS. 1-9, the bushing, the anode disk and the spigot may also continue further in axial direction—possibly with a different progression or different configuration—and/or also be connected to further components.

Figure 1:
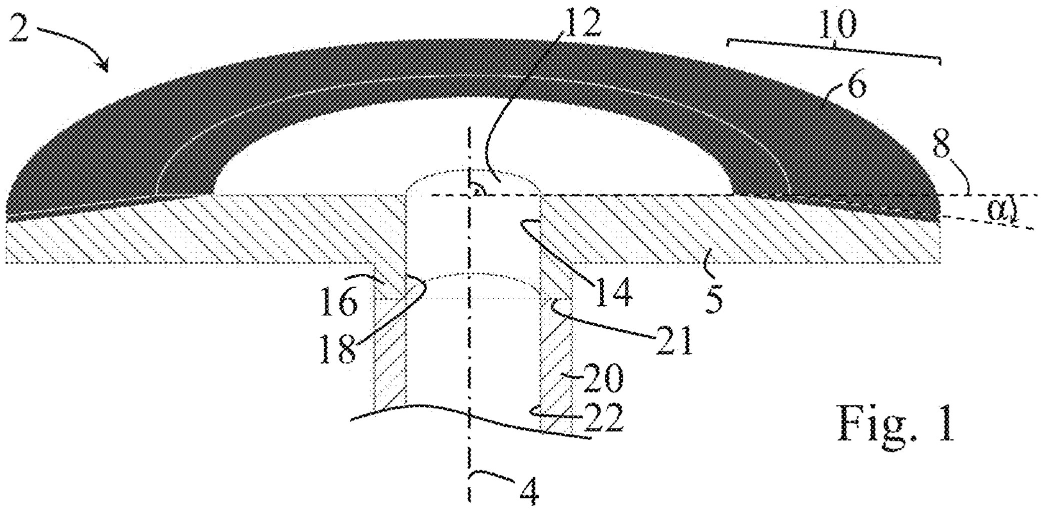
FIG. 1: a perspective view of a rotary x-ray anode of the invention in cross section according to a first embodiment.
Figure 2A:
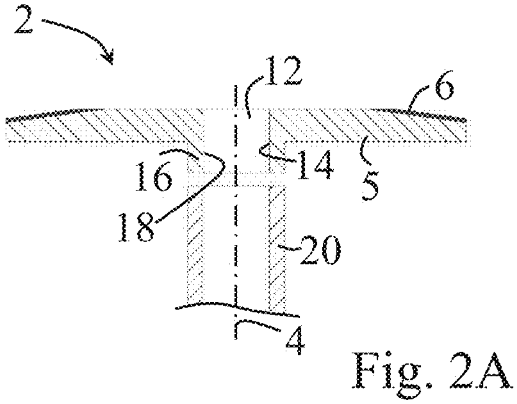
FIG. 2A, 2B: two cross-sectional views of the rotary x-ray anode from FIG. 1 for illustration of the production.
Figure 2B:
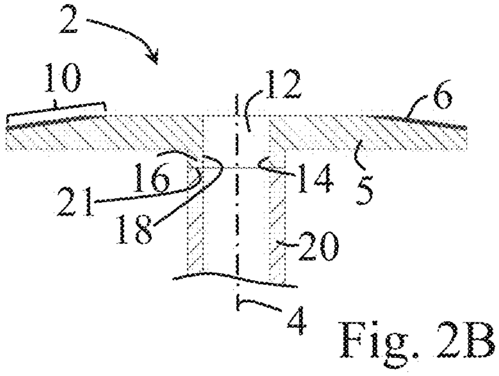

Elucidated hereinafter, with reference to FIGS. 1 and 2A, 2B, is a first embodiment of an inventive rotary x-ray anode 2. In its basic form, this has an anode disk 5 made of MHC formed in a rotationally symmetric manner with respect to an axis of rotation 4 (axial direction). On one side of the anode disk 5 is a circumferential focal track 6 with a focal track coating of a W—Re alloy (W: 95% by weight; Re: 5% by weight). In the region of the focal track 6, the anode disk 5 has a circumferential beveled focal track surface 10 which is angled (at an angle $\alpha$) relative to a reference plane 8 that extends at right angles to the axis of rotation 4. A hole 12 extends through the anode disk 5, the inner wall 14 of which is formed as a liquid metal bearing running surface. On the opposite side from the focal track 6, the anode disk has a tubular connection port 16 in monolithic form which has been attached by forging and is made of the material of the anode disk 5, and which protrudes with respect to the peripheral face on the outside of the anode disk 5. The inner wall 18 thereof extends the hole 12 in the anode disk 5 and likewise takes the form of a liquid metal bearing running surface. A tubular bushing 20 likewise formed from MHC is bonded by its axial (annular) end face via a material bond 21 to the correspondingly formed axial (annular) end face of the connection port 16. The inner wall 22 of the bushing 20 is formed circumferentially as a liquid metal bearing running surface. The liquid metal bearing running surfaces of the anode disk 5, of the connection port 16 and of the bushing 20 together form a continuous liquid metal bearing running surface which, in the present case, extends in a linear manner in the form of an outer cylinder face, which forms part of a liquid metal bearing outer shell. FIG. 2A shows the bushing 20 and the anode disk 5 still as separate components, and FIG. 2B shows them in the ultimate state after establishment of the material bond 21 via friction welding (and further mechanical processing). As elucidated, the friction welding in axial direction leads to truncation of the connection port 16 and of the bushing 20 in the region of the connection zone.

In the description of further embodiments that follows—where identical or largely identical components are affected—identical reference numerals are used, and predominantly the differences with respect to the first embodiment are addressed.

Figure 3:
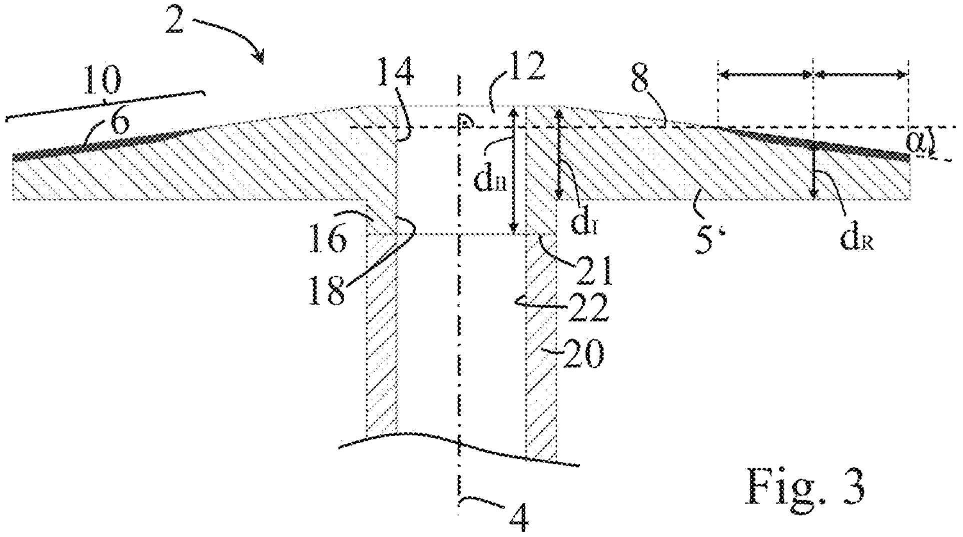
FIG. 3: a cross-sectional view of a rotary x-ray anode of the invention according to a second embodiment.

In the second embodiment shown in FIG. 3, the thickness (measured in axial direction) of the anode disk 5' increases continuously in the radially inward direction. In particular, the thickness increases by 30-300% proceeding from a reference thickness $d_R$ (measured radially in the middle in the region of the beveled focal track surface 10) up to a maximum thickness dii in the region of the hole 12 (with inclusion of all components monolithically bonded to the anode disk 5', i.e. in the present case of the connection port 16). In addition, the thickness increases in the radially inward direction by 20-150% proceeding from the reference thickness $d_R$ even without including the monolithically formed connection port 16, in which case the thickness di in the inner region which is crucial for this purpose is measured directly (radially) outside the connection port 16.

Figure 4:
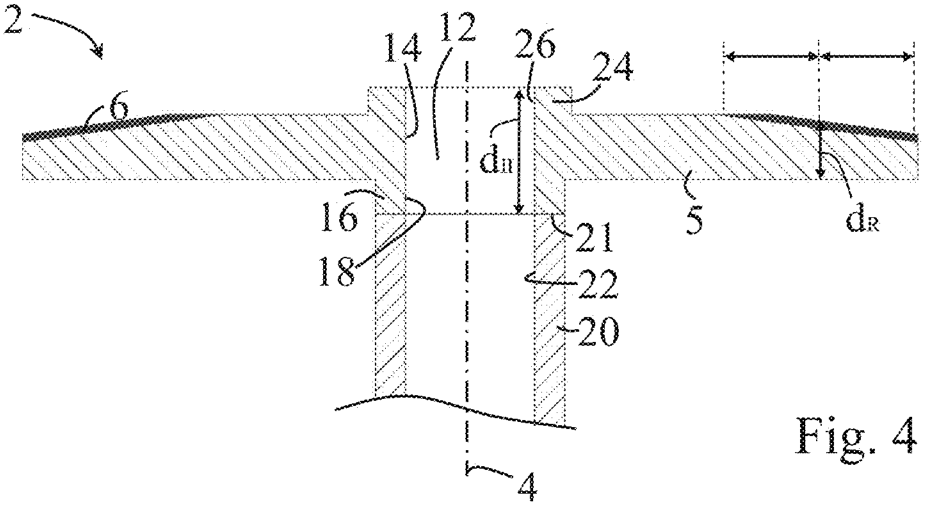
FIG. 4: a cross-sectional view of a rotary x-ray anode of the invention according to a third embodiment.
Figure 5:
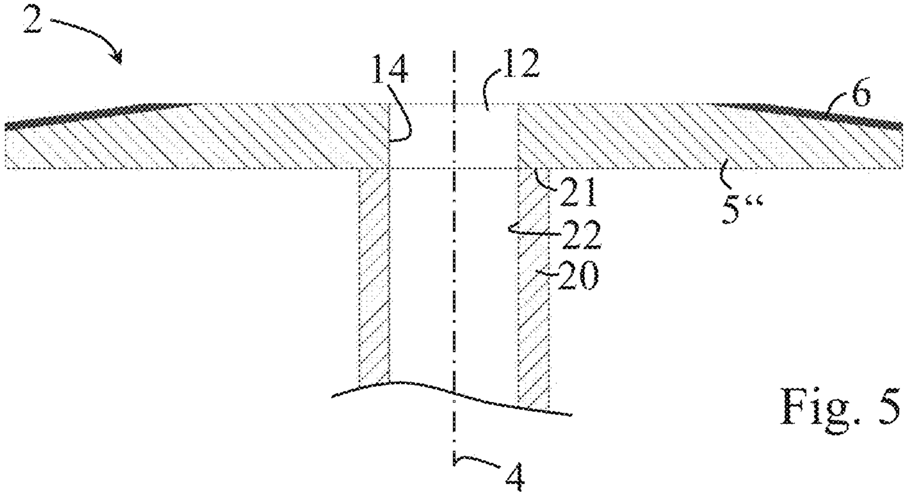
FIG. 5: a cross-sectional view of a rotary x-ray anode of the invention according to a fourth embodiment.

In the third embodiment shown in FIG. 4, the anode disk 5—by comparison with the first embodiment—on the opposite side from the bushing 20 has an extension port 24 that extends the (passage) hole 12 of the anode disk 5 with its inner wall 26 and which protrudes with respect to the peripheral face on the outside of the anode disk 5. The inner wall 26 of the extension port 24 is likewise formed circumferentially as a liquid metal bearing running surface and hence forms part of the liquid metal bearing outer shell. In addition, FIG. 4 shows the increase in thickness proceeding from the reference thickness $d_R$ up to the maximum thickness dii (including all components monolithically bonded to the anode disk 5, i.e. in the present case the connection port 16 and the extension port 24). In the fourth embodiment shown in FIG. 5, the anode disk 5''—by comparison with the first embodiment—does not have a connection port. Instead, the bushing 20 is bonded via a diffusion bond directly to the planar face of the anode disk 5''.

In the embodiments shown in FIGS. 6-9, the bushing 20 is disposed on the same side as the focal track 6. By comparison with the first embodiment, in the fifth embodiment shown in FIG. 6, the connection port 16' is disposed on the anode disk 5''', likewise on the side of the focal track 6. In the sixth embodiment shown in FIG. 7, the anode disk 5''—similarly to the fourth embodiment (see FIG. 5)—does not have a connection port. Instead, the bushing 20 is bonded via a diffusion bond directly to the planar face of the anode disk 5''. The seventh embodiment shown in FIG. 8 differs from the sixth embodiment in that the thickness of the anode disk 5'''' increases continuously in the radially inward direction.

Figure 6:
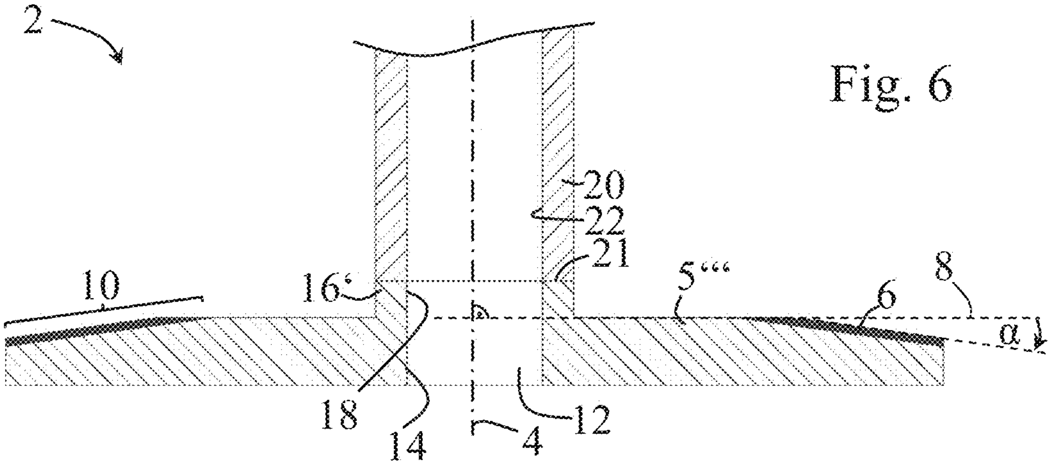
FIG. 6: a cross-sectional view of a rotary x-ray anode of the invention according to a fifth embodiment.
Figure 7:
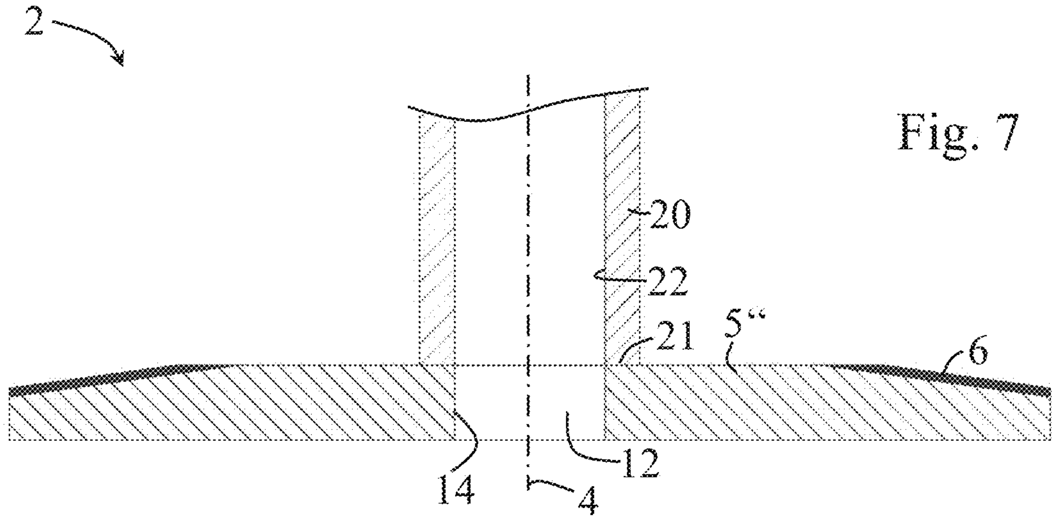
FIG. 7: a cross-sectional view of a rotary x-ray anode of the invention according to a sixth embodiment.
Figure 8:
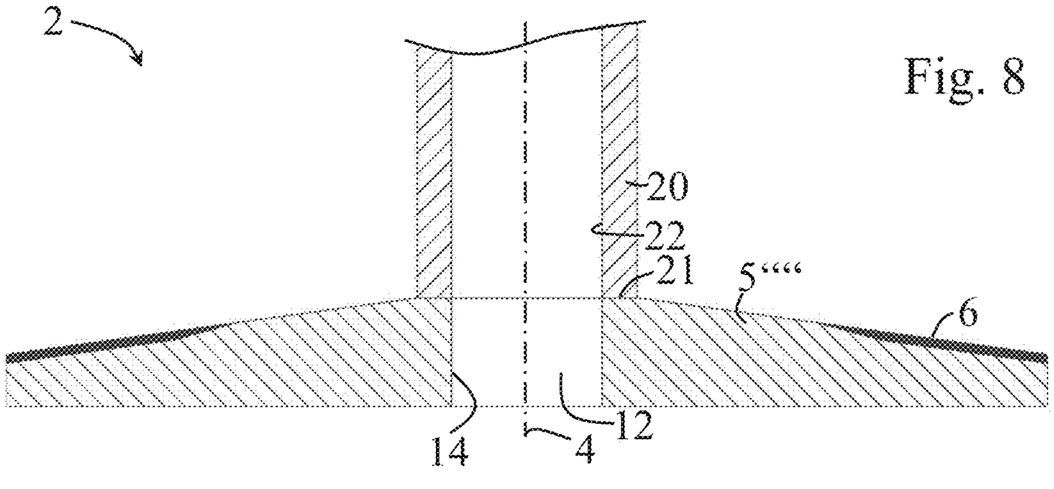
FIG. 8: a cross-sectional view of a rotary x-ray anode of the invention according to a seventh embodiment.
Figure 9:
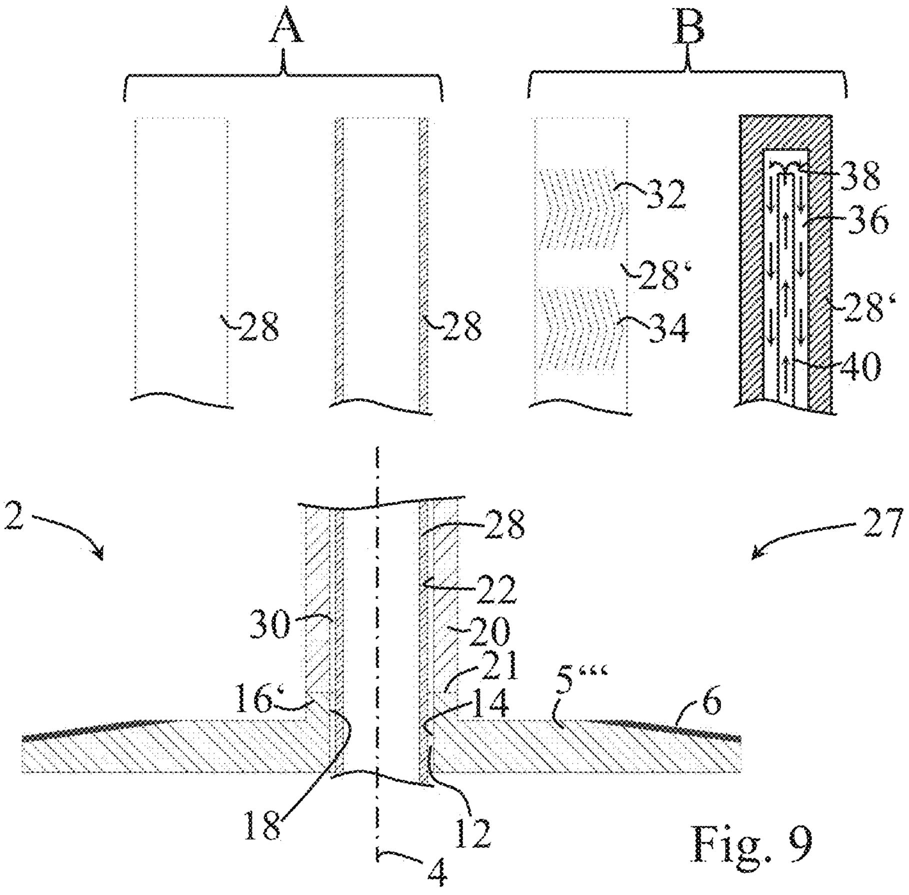
FIG. 9: a cross-sectional view of a rotary x-ray anode system of the invention with inserted spigot, showing two variants A and B of the spigot above the cross-sectional view, each once in top view and once in cross-sectional view.

FIG. 9 shows a rotary x-ray anode system 27 in which the rotary x-ray anode 2 together with anode disk 5''', connection port 16' and bushing 20 is formed in accordance with the fifth embodiment (cf. FIG. 6). Also shown is a spigot 28 inserted on the inside, on which the liquid metal bearing inner shell is formed. A bearing gap 30 is formed between the liquid metal bearing inner shell of the spigot 28 and the liquid metal bearing outer shell, which, in use, is filled with liquid metal (not shown). Above the rotary x-ray anode are shown two illustrative variants for the formation of the spigot 28. In the first variant A (shown at the top in FIG. 9, once on the left in top view, and once in cross section to the right and within the rotary x-ray anode 2), the spigot 28 has a tubular basic form, and a smooth surface on the outside. In the second variant B (shown at the top in FIG. 9 as the third figure from the left, once in top view, and to the right once in cross section), the spigot 28' has two superficially structured running sections 32, 34 that are spaced apart in axial direction. The spigot 28' also has a coolant duct 36 that runs on the inside, which has a coolant tube 40 inserted into a blind hole 38, with the diameter of the coolant tube 40 chosen so as to be correspondingly smaller than that of the blind hole 38, such that coolant, for example, can flow in via the coolant tube 40 and flow back on the outside through the annular duct formed between the coolant tube 40 and the blind hole 38.

Production Examples

Example 1: There follows a description of a production process for a rotary x-ray anode of the invention, in which the anode disk and the bushing are formed from MHC and are bonded to one another via friction welding. First of all, the anode disk and a stub with a cylindrical basic form are produced by powder metallurgy, which comprises the steps of providing corresponding starting powders (for MHC), pressing and sintering, and in the present case subsequent forming (forging of the anode disk; radial forging of the stub). The stub is processed mechanically, such that it has a tubular basic form, in order to form the later bushing. In addition, in the course of forming (forging), a protruding tubular connection port (with an axial length of 40 mm) is forged centrally onto the anode disk on one side, meaning that the connection port is formed monolithically from the material of the anode disk. Both the end face of the tubular stub and the end face of the connection port have an area to be welded of 2000 mm$^2$ and an internal diameter of 44 mm (the external diameter is determined thereby). In the present case, a friction welding machine with direct driving of the spindle is used. The tubular stub is clamped into the (non-rotating) holder of the friction welding machine, and the anode disk into the (rotating) spindle holder. Subsequently, the anode disk is set in rotation (2000 revolutions per minute) and pressed against the stub with a friction pressure of 30 bar. Subsequently, the drive of the anode disk is stopped and the compression pressure is increased to 65 bar. The total friction time, i.e. that within which relative rotary motion takes place between anode disk and stub, is 3 seconds. There then follows a mechanical processing operation for establishment of the final geometry, with the tubular stub then forming the bushing. Further fitted components, coatings, coverings, etc. may—as elucidated at the outset—also be added on. Depending on the geometry of the components and the processing steps, it is possible to include low-stress annealing (for example at temperatures in the range of 1100° C.-1300° C.) once or more than once during the production process.

Example 2: There follows a description of a production process for a rotary x-ray anode of the invention, in which the anode disk and the bushing are formed from TZM and are bonded to one another via friction welding. The same steps and parameters as in example 1 are employed, except for the following differences: starting powders for production of the anode disk and the stub from TZM (and not from MHC) are provided. The friction pressure used is only 25 bar, and the compression pressure is increased to only 60 bar after the driving of the anode disk has ended.

Example 3: There follows a description of a production process for a rotary x-ray anode of the invention, in which the anode disk and the bushing are formed from TZM and are bonded to one another via diffusion bonding. First of all, in the same way as in the second working example, the anode disk and a tubular stub are produced from TZM. Both the end face (to be bonded) of the tubular stub and the end face (to be bonded) of the connection port are processed mechanically and then ground and/or polished in order to provide a smooth planar surface. Subsequently, the diffusion bonding of the two components with mutually adjoining end faces is conducted at a temperature of 1700° C. and a pressure of 10 MPa and for a duration of at least 5 minutes (preferably in the range of 6-15 minutes).

The present invention is not limited to the working examples shown in the figures. More particularly, the liquid metal bearing running surface of the liquid metal bearing outer shell need not necessarily have a linear progression in the form of an outer cylinder face; it may also, as elucidated at the outset, have a stepped progression, a circumferential ridge, etc., in which case the liquid metal bearing inner shell then typically has a correspondingly adapted progression.

The invention claimed is:

1. A rotary x-ray anode with an integrated liquid metal bearing outer shell, comprising:

an anode disk made of Mo or a Mo-based alloy, said anode disk being formed with a central hole in a region of an axis of rotation and extending in an axial direction through at least a portion of said anode disk;

a bushing made of Mo or a Mo-based alloy bonded to said anode disk via a material bonding connection;

said bushing having an inner wall continuing said central hole of said anode disk and being formed circumferentially as a liquid metal bearing running surface, at least over an axial section thereof, and forming a first subsection of a liquid metal bearing outer shell;

a side of said anode disk facing toward said bushing being monolithically formed with a connection port, said connection port having an inner wall extending said central hole in said anode disk and said connection port protruding with respect to a peripheral face on an outside of said anode disk, with at least an axial section of said inner wall of said connection port being formed circumferentially as a liquid metal bearing running surface and forming a portion of a second subsection of said liquid metal bearing outer shell;

said first and second subsections of the liquid metal bearing outer shell adjoining one another and together forming a continuous liquid metal bearing running surface of the liquid metal bearing outer shell, and said material bonding connection is formed between said protruding connection port of said anode disk and said bushing, and said material bonding connection is a bond formed by a process selected from the group consisting of friction welding and beam welding.

2. The rotary x-ray anode according to claim 1, wherein said Mo-based alloy is at least one alloy selected from the group consisting of alloy MHC and alloy TZM, and wherein:

MHC has the following composition:

a Hf content of 1.00-1.30% by weight;

a C content of 500-1200 μg/g; and balance Mo;

where a content of any metallic impurities is ≤5000 μg/g and a total content of any impurities selected from the group consisting of H, N, and O is ≤1000 μg/g;

TZM has the following composition:

a Ti content of 0.40-0.55% by weight;

a Zr content of 0.06-0.12% by weight;

a C content of 50-500 μg/g;

balance Mo;

where a content of any metallic impurities is ≤5000 μg/g and a total content of any impurities selected from the group consisting H, C, N, and O is ≤1500 μg/g.

3. The rotary x-ray anode according to claim 1, wherein said anode disk and said bushing are each formed of molybdenum or are each formed from the same molybdenum-based alloy.

4. The rotary x-ray anode according to claim 1, wherein said material bonding connection is a friction welding bond.

5. The rotary x-ray anode according to claim 1, wherein said central hole in said anode disk is a passage hole and said anode disk, on a side opposite from said bushing, is formed with an extension port, said extension port having an inner wall extending said passage hole of said anode disk and said extension port protruding with respect to a peripheral face on an outside of the anode disk, with at least an axial section of said inner wall of said extension port being formed circumferentially as a liquid metal bearing running surface and forming a portion of said second subsection of said liquid metal bearing outer shell.

6. The rotary x-ray anode according to claim 1, wherein said anode disk has a thickness that increases in a radial direction toward the axis of rotation, with an increase in the thickness proceeding from a reference thickness measured radially in a middle of a beveled focal track surface up to the thickness in the region of said central hole being 30-300%.

7. The rotary x-ray anode according to claim 1, wherein said anode disk is formed with a plurality of slits arranged uniformly over a circumference and passing through a thickness of said anode disk, each of said slits extending over a radial section in a region between an outer circumference of said anode disk and said central hole in said anode disk.

8. A rotary x-ray anode system, comprising:

a rotary x-ray anode with an integrated liquid metal bearing outer shell according to claim 1; and a liquid metal bearing inner shell inserted into said liquid metal bearing outer shell and having a liquid metal bearing running surface;

said liquid metal bearing outer shell and said liquid metal bearing inner shell being matched to one another to form a defined bearing gap therebetween.

9. The rotary x-ray anode system according to claim 8, which comprises at least one circumferential mechanical boundary element disposed in a region of at least one axial end section of said liquid metal bearing running surface of said liquid metal bearing outer shell and/or of said liquid metal bearing running surface at said liquid metal bearing inner shell, said at least one circumferential mechanical boundary element, during a use of the x-ray anode system, limiting a flow of liquid metal present in the bearing gap in the axial direction.

10. The rotary x-ray anode system according to claim 8, which comprises a circumferential coating provided in a region of at least one axial end section of said liquid metal bearing running surface at the liquid metal bearing outer shell and/or in a region of the liquid metal bearing running surface at the liquid metal bearing inner shell, said circumferential coating being formed to suppress wetting by a liquid metal in the bearing gap during a use of the x-ray anode system.

11. The rotary x-ray anode system according to claim 8, wherein said liquid metal bearing inner shell is formed on an insert spigot guided through said bushing at least into the central hole formed in said anode disk.

12. The rotary x-ray anode system according to claim 8, wherein at least one of said liquid metal bearing running surface at said liquid metal bearing outer shell or said liquid metal bearing running surface at said liquid metal bearing inner shell is formed with at least two circumferential, superficially structured running sections that are spaced apart in axial direction.

13. A method of producing a rotary x-ray anode, the method comprising:

providing an anode disk made of molybdenum or a molybdenum-based alloy with a connection port monolithically formed with the anode disk;

said anode disk being formed with a central hole in a region of an axis of rotation and extending in an axial direction through at least a portion of said anode disk;

providing a stub of Mo or an Mo-based alloy;

materially bonding the stub to the connection port of said anode disk centrally relative to the axis of rotation of the anode disk; and mechanically working the anode disk with said connection port and the stub to form a rotary x-ray anode with an integrated liquid metal bearing outer shell, wherein the stub forms a bushing with a liquid metal bearing running surface and the central hole of the anode disk has an inner wall and the inner wall has at least an axial section that is formed circumferentially as a liquid metal bearing running surface;

the bushing made of Mo or a Mo-based alloy bonded to said anode disk via a material bonding connection;

said bushing having an inner wall continuing said central hole of said anode disk and being formed circumferentially as a liquid metal bearing running surface, at least over an axial section thereof, and forming a first subsection of a liquid metal bearing outer shell;

a side of said anode disk facing toward said bushing is formed with the connection port monolithically formed with the anode disk, said connection port having an inner wall extending said central hole in said anode disk, and said connection port protruding with respect to a peripheral face on an outside of said anode disk, with at least an axial section of said inner wall of said connection port being formed circumferentially as a liquid metal bearing running surface and forming a portion of a second subsection of said liquid metal bearing outer shell; and said first and second subsections of the liquid metal bearing outer shell adjoining one another and together forming a continuous liquid metal bearing running surface of the liquid metal bearing outer shell, and wherein said material bonding connection is formed between said protruding connection port of said anode disk and said bushing and wherein said material bonding connection is a bond formed by a process selected from the group consisting of friction welding and beam welding.

* * * * *